US012650747B2

(12) United States Patent
Shah et al.

(10) Patent No.: US 12,650,747 B2
(45) Date of Patent: Jun. 9, 2026

(54) SENSING DEVICE WITH SEGMENTED ELECTRODES

(71) Applicant: Synaptics Incorporated, San Jose, CA (US)

(72) Inventors: Vishal S. Shah, Fremont, CA (US); Fabrice Dayan, Lausanne (CH); Prerak Kiran Baxi, Roselle, IL (US); Danny Joseph, Remaufens (CH); Guozhong Shen, Fremont, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 18/961,019

(22) Filed: Nov. 26, 2024

(65) Prior Publication Data

US 2026/0147426 A1 May 28, 2026

(51) Int. Cl.
*G06F 3/044* (2006.01)
*G06F 3/041* (2006.01)

(52) U.S. Cl.
CPC ........ *G06F 3/04166* (2019.05); *G06F 3/0445* (2019.05); *G06F 3/0446* (2019.05); *G06F 3/0448* (2019.05); *G06F 2203/04108* (2013.01)

(58) Field of Classification Search
CPC .. G06F 3/04166; G06F 3/0445; G06F 3/0446; G06F 3/0448; G06F 2203/04108
See application file for complete search history.

(56) References Cited

U.S. PATENT DOCUMENTS

2014/0253498 A1 9/2014 Suzuki et al.
2015/0042600 A1 2/2015 Lukanc et al.
2015/0324036 A1* 11/2015 Schwartz ............ G06F 3/04166
345/174
2016/0183382 A1 6/2016 Solven et al.
2021/0141474 A1 5/2021 Tanemura et al.
2022/0164083 A1 5/2022 Lee et al.
2024/0281090 A1* 8/2024 Ku ........................ G06F 3/0412

OTHER PUBLICATIONS

International Search Report and Written Opinion Of The International Search Authority, Mar. 26, 2026.

* cited by examiner

*Primary Examiner* — Deeprose Subedi
(74) *Attorney, Agent, or Firm* — Leydig, Voit & Mayer, Ltd.

(57) ABSTRACT

A sensing device and method for driving segmented electrodes is provided. The sensing device includes a sensing area having a first sensing region and a second sensing region. The sensing device also includes a plurality of receiver electrodes comprising a first set of receiver electrodes disposed in the first sensing region and a second set of receiver electrodes disposed in the second sensing region and a plurality of segmented transmitter electrodes. Each segmented transmitter electrode comprises a first transmitter electrode and a second transmitter electrode. The first transmitter electrode is isolated from the second transmitter electrode such that the first transmitter electrode is separately controllable from the second transmitter electrode. The first transmitter electrode is disposed in the first sensing region and the second transmitter electrode is disposed in the second sensing region. The device is configured to drive the plurality of segmented transmitter electrodes with sensing signals; receive resulting signals from the plurality of receiver electrodes; and detect presence of an input object proximate to the sensing area.

20 Claims, 5 Drawing Sheets

SENSING DEVICE WITH SEGMENTED ELECTRODES

FIELD

The disclosure herein is generally related to electronic devices, and more specifically, to a capacitive sensing device with segmented electrodes.

BACKGROUND

Input devices including proximity sensor devices, e.g., capacitive sensor devices, are used in a variety of electronic systems. A proximity sensor device may include a sensing area, demarked by a surface, in which the proximity sensor device determines the presence, location, force and/or motion of one or more input objects. Proximity sensor devices may be used to provide interfaces for the electronic system. For example, proximity sensor devices may be used as input devices for larger computing systems, such as touchpads integrated in, or peripheral to, automotive systems, notebook computers, desktop computers, or internet of things (IoT) devices. Proximity sensor devices may also often be used in smaller computing systems, such as touch screens integrated in cellular phones and other mobile devices.

Proximity sensor devices may be used in electronic systems with a wide or ultra-wide aspect ratio. Such devices may require a large number of sensing channels and/or multiple controllers.

SUMMARY

In one embodiment, an input device is provided. The input device includes a sensing area having a first sensing region and a second sensing region and a sensor circuit. The input device also includes a plurality of receiver electrodes comprising a first set of receiver electrodes disposed in the first sensing region of the sensing area and a second set of receiver electrodes disposed in the second sensing region of the sensing area and a plurality of segmented transmitter electrodes. Each segmented transmitter electrode of the plurality of segmented transmitter electrodes comprises a first transmitter electrode and a second transmitter electrode. The first transmitter electrode is isolated from the second transmitter electrode such that the first transmitter electrode is separately controllable from the second transmitter electrode. The first transmitter electrode is disposed in the first sensing region of the sensing area and the second transmitter electrode is disposed in the second sensing region of the sensing area. The sensor circuit is configured to drive the plurality of segmented transmitter electrodes with sensing signals; receive resulting signals from the plurality of receiver electrodes; and detect presence of an input object proximate to the sensing area.

In another embodiment, a processing system with a sensor circuit is provided. The sensor circuit is configured to drive a plurality of segmented transmitter electrodes with sensing signals. Each segmented transmitter electrode of the plurality of segmented transmitter electrodes comprises a first transmitter electrode and a second transmitter electrode. The first transmitter electrode is isolated from the second transmitter electrode such that the first transmitter electrode is separately controllable from the second transmitter electrode. The first transmitter electrode is disposed in a first sensing region of a sensing area and the second transmitter electrode is disposed in a second sensing region of the sensing area. The sensor circuit is also configured to receive resulting signals from a plurality of receiver electrodes. The plurality of receiver electrodes comprise a first set of receiver electrodes disposed in the first sensing region of the sensing area and a second set of receiver electrodes disposed in the second sensing region of the sensing area. The sensor circuit is further configured to detect presence of an input object proximate to the sensing area.

In yet another embodiment, method for sensing an input object is provided. The method includes driving a plurality of segmented transmitter electrodes with sensing signals. Each segmented transmitter electrode of the plurality of segmented transmitter electrodes comprises a first transmitter electrode and a second transmitter electrode. The first transmitter electrode is isolated from the second transmitter electrode such that the first transmitter electrode is separately controllable from the second transmitter electrode. The first transmitter electrode is disposed in a first sensing region of a sensing area and the second transmitter electrode is disposed in a second sensing region of the sensing area. The method also includes receiving resulting signals from a plurality of receiver electrodes. The plurality of receiver electrodes comprise a first set of receiver electrodes disposed in the first sensing region of the sensing area and a second set of receiver electrodes disposed in the second sensing region of the sensing area. The method further includes detecting presence of the input object proximate to the sensing area.

DETAILED DESCRIPTION

The following detailed description is merely exemplary in nature and is not intended to limit the disclosure or the application and uses of disclosed embodiments and methods. Furthermore, there is no intention to be bound by any expressed or implied theory presented in the preceding background, summary, brief description of the drawings or the description that follows.

Capacitive proximity sensor devices typically include transmitter and receiver electrodes coupled to one or more controllers, e.g., touch controllers or touch and display controllers. In certain implementations, a touch sensor sensing area, e.g., such as one incorporated in a display, may have a wide or ultrawide aspect ratio. For example, whereas conventional displays may have an aspect ratio of about 16:9 or 8:5, wider aspect ratios, such as 7:1 may be used. These wider aspect ratio sensing areas may require a large number of sensing channels and/or multiple touch controllers to cover the entire sensing area. In certain embodiments described herein, sensor electrodes (e.g., transmitter electrodes) are segmented and other sensor electrodes (e.g., receiver electrodes) share channels, e.g., multiple receiver electrodes interfaced to a single analog front end (AFE). Embodiments provide for shorter transmitter electrodes thereby minimizing resistance and background capacitance, which facilitates shorter sensing frames due to, for example, shorter charge time for the transmitter electrodes. Certain embodiments also facilitate using multiple transmitter frequencies, which also shortens sensing frames by permitting simultaneous operation of transmitter electrodes. Embodiments also facilitate the use of a single touch controller in applications where multiple touch controllers would otherwise be needed.

Figure 1:
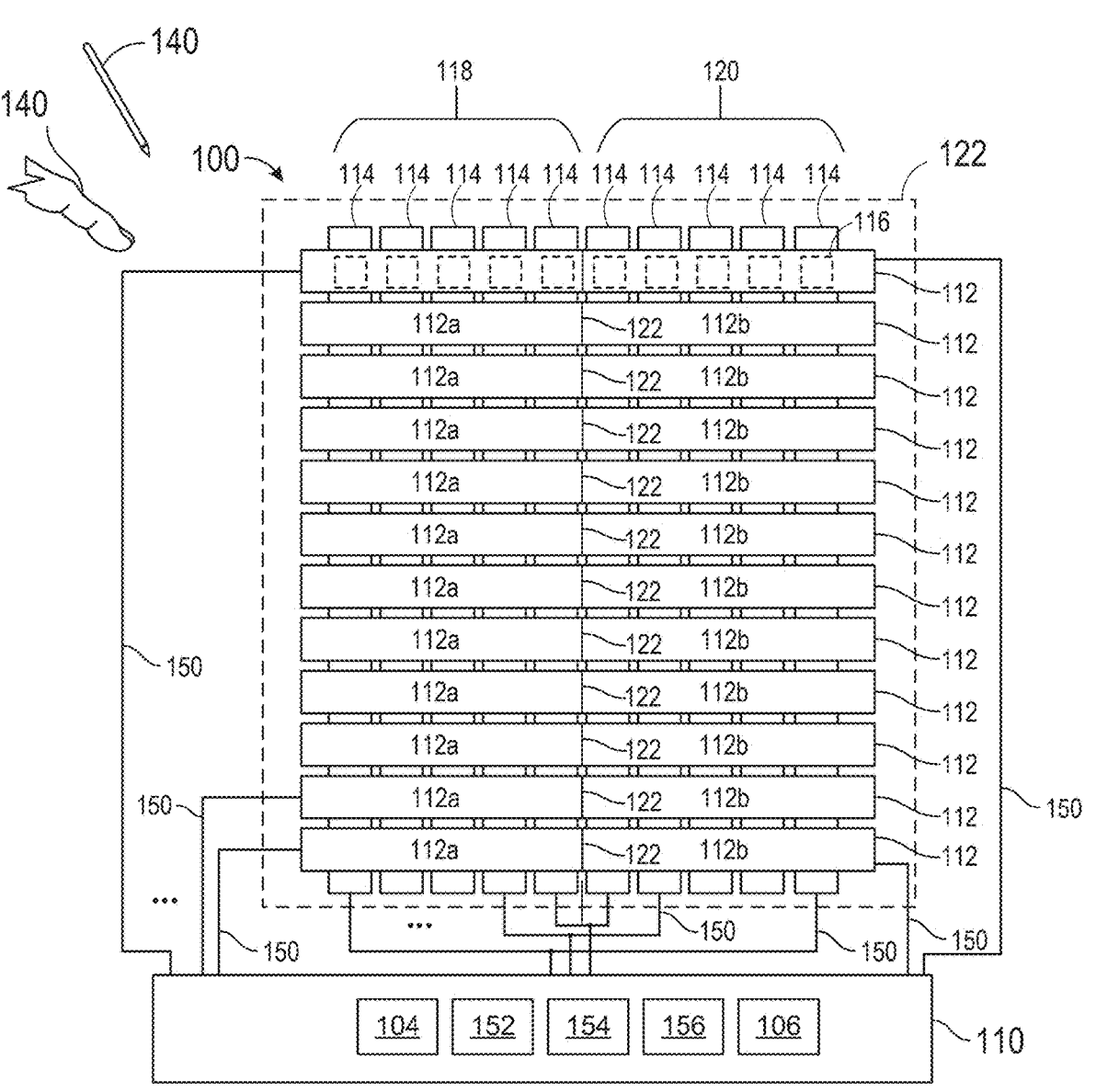
FIG. 1 is a block diagram of an input device, according to one or more embodiments.

FIG. 1 illustrates input device 100 configured to detect an input object during capacitive sensing. The input device 100 may be configured to provide input to an electronic system (not shown). Some non-limiting examples of electronic systems include, automotive multimedia centers, automotive cockpit displays, desktop computers, laptop computers, notebook computers, tablets, terminals, kiosks, cellular phones, and internet of things (IoT) devices, among others.

The input device 100 includes a processing system 110, sensor electrodes 112 and sensor electrodes 114. The processing system 110 operates the sensor electrodes 112 and 114 to detect one or more input objects 140 in a sensing area 122 of the input device 100. Example input objects 140 include fingers and styli, as shown in FIG. 1.

The sensing area 122 of the input device 100 encompasses any space above, around, in and/or near the input device 100 in which the input device 100 is able to detect user input, e.g., user input provided by one or more input objects 140. In accordance with certain embodiments, the sensing area 122 may include multiple sensing regions. As but one illustrative example, the sensing area 122 may include a left sensing region 118 and a right sensing region 120 as generally shown.

The sensor electrodes 112 and the sensor electrodes 114 are coupled to the processing system 110 using any suitable means, e.g., via conductive paths 150, such as traces or other conductive coupling. An exemplary pattern of the sensor electrodes 112 and the sensor electrodes 114 as illustrated in FIG. 1 comprises a plurality of rows and a plurality of columns. It is contemplated, however, that the sensor electrodes may be arranged in other patterns. In certain embodiments, the rows and the columns of the sensor electrodes 112 and the sensor electrodes 114 may be comprised of smaller individual sensor electrodes 116 electrically coupled to one another to form the rows and columns. In other embodiments, the rows and columns of sensor the sensor electrodes 112 and the sensor electrodes 114 may be formed from continuous conductors or other suitable arrangements.

In the examples that follow, the rows, namely, the sensor electrodes 112 are transmitter electrodes and the columns, namely, the sensor electrodes 114 are receiver electrodes. It will be understood that such example is to facilitate discussion of the various embodiments. The embodiments contemplate that the rows may be receiver electrodes and the columns may be transmitter electrodes. In certain modes, such as absolute capacitance, the rows and columns may each be used both as transmitter and receiver electrodes. Further, embodiments contemplate configurations other than rows and columns of electrodes. Any suitable configuration may be used.

As generally illustrated, the transmitter electrodes 112 (e.g., rows) may be segmented. For example, line 122 in each element of the transmitter electrodes 122 demarcates two segments, a left segment 112a and right segment 112b. The left segment 112a and the right 112b segment are isolated from one another by any suitable means, e.g., physical space and/or use of an electrically insulating material, such that each segment (112a and 112b) of each transmitter electrode 112 is independently controllable by the processing system 110. Thus, transmitter electrode segment 112a may be driven with a sensing signal independently of a sensing signal applied to transmitter electrode segment 112b. The configuration thereby provides multiple sensing regions, e.g., the left sensing region 118 and right sensing region 120 within the overall sensing area 122 as generally shown.

The sensor electrodes 112 and the sensor electrodes 114 may be disposed in a common layer. For example, the sensor electrodes 112 and the sensor electrodes 114 may be disposed on a first side of a common substrate. In other embodiments, the sensor electrodes 112 and the sensor electrodes 114 may be disposed in two or more layers.

The sensor electrodes 112 and the sensor electrodes 114 may be comprised of a conductive material such as a metal mesh, indium tin oxide (ITO), or the like. Further, the sensor electrodes 112 and the sensor electrodes 114 are ohmically isolated from each other such that one or more insulators separate the sensor electrodes and prevent them from electrically shorting to each other.

The processing system 110 includes sensor circuit 104. Further, the processing system 110 may include a determination circuit 106. The determination circuit 106 may be part of the sensor circuit 104 or may be a separate circuit. The processing system 110 is configured to operate the sensor electrodes 112 and the sensor electrodes 114 to detect one or more input objects 140 in the sensing area of the input device 100. The processing system 110 fully or partially resides in one or more integrated circuit (IC) chips. For example, the processing system 110 may include a single IC chip. Alternatively, the processing system 110 includes multiple IC chips. The processing system may include a memory (not shown) for storing computer executable instructions for performing methods described herein and/or for storing data relating to detected input objects 140, image data or for other purposes. Alternatively, the processing system 110 may be interfaced to a separate memory.

The sensor circuit 104 is coupled to the sensor electrodes 112 and the sensor electrodes 114 via the conductive paths 150, e.g., routing traces, and is configured to drive the sensor electrodes with sensing signals to detect one or more input objects 140 in the sensing area of the input device 100. The sensor circuitry 104 may also be configured to drive the sensor electrodes 112 or the sensor electrodes 114 with other signals, such as guarding signals. As noted, in the example, the rows of sensor electrodes are transmitter electrodes 112 and the columns of the sensor electrodes are receiver electrodes 114 although, as previously described, it will be understood a different configuration may be used.

The sensor circuit 104 includes digital and/or analog circuitry. For example, the sensor circuit 104 comprises transmitter (or driver) circuitry configured to drive sensing signals onto the transmitter sensor electrodes, e.g., sensor electrodes 112 and receiver circuitry to receive resulting signals from the receiver sensor electrodes, e.g., sensor electrodes 114. The transmitter circuitry may include one or more amplifiers and/or one or more modulators configured to drive sensing signals on to the transmitter electrodes 112. The processing system 110 then receives resulting signals from the receiver electrodes 114. Transmitter electrodes 114 may be segmented. Multiple receiver electrodes 114 may share a common interface, e.g., analog front end (AFE) 152.

The processing system 110 may include analog to digital converters (ADCs) 154, AFEs 152 comprising, for example, integrators configured to receive resulting signals from the receiver sensor electrodes 114. The ADCs 154, AFEs 152 and mixers 156 may be part of the sensor circuit 104 or may form different circuits.

In one embodiment, the sensor circuit 104 drives a first one or more of the transmitter electrodes 112 with a transcapacitive sensing signal and receives a resulting signal with a second one or more of the receiver electrodes 114 to operate the sensor circuitry for transcapacitive sensing. Operating the sensor electrodes 112 and 114 for transcapacitive sensing detects changes in capacitive coupling between sensor electrodes driven with a transcapacitive sensing signal and sensor electrodes operated as receiver electrodes. The capacitive coupling may be reduced when an input object (e.g., the input object 140) coupled to a system ground approaches the sensor electrodes. Driving the sensor electrodes 112 with transcapacitive sensing signals comprises modulating the sensor electrodes 112 relative to a reference voltage, e.g., system ground.

The transcapacitive sensing signal is a periodic or aperiodic signal that varies between two or more voltages. Further, the transcapacitive sensing signal has a frequency between 100 kHz and 1 MHz. In other embodiments, other frequencies may be utilized. The transcapacitive sensing signal may have a peak-to-peak amplitude in a range of about 1 V to about 10 V. However, in other embodiments, the transcapacitive sensing signal may have a peak-to-peak amplitude greater than about 10 V or less than 1 V. Additionally, the transcapacitive sensing signal may have a square waveform, a sinusoidal waveform, triangular waveform, a trapezoidal waveform, or a sawtooth waveform, among others.

In some embodiments, operating the receiver electrodes 114 to receive resulting signals comprises holding the receiver electrodes 114 at a substantially constant voltage or modulating the receiver electrodes 114 relative to the transcapacitive sensing signal. A resulting signal includes effect(s) corresponding to one or more transcapacitive sensing signals, and/or to one or more sources of environmental interference, e.g., other electromagnetic signals.

In one embodiment, the sensor circuit 104 operates the sensor electrodes 112 and 114 for absolute capacitive sensing by driving a first one or more of the sensor electrodes 112 or 114 with an absolute capacitive sensing signal and receiving a resulting signal with the driven sensor electrodes. Operating the sensor electrodes 112 and/or 114 for absolute capacitive sensing detects changes in capacitive coupling between sensor electrodes driven with an absolute capacitive sensing signal and an input object (e.g., the input object 140). The capacitive coupling of the sensor electrodes driven with the absolute capacitive sensing signal is altered when an input object (e.g., the input object 140) coupled to a system ground approaches the sensor electrodes.

The absolute capacitive sensing signal is a periodic or aperiodic signal that varies between two or more voltages. Further, the absolute capacitive sensing signal has a frequency between about 100 kHz and 1 MHz. In other embodiments, other frequencies may be utilized. Additionally, the absolute capacitive sensing signal may have a square waveform, a sinusoidal waveform, triangular waveform, a trapezoidal waveform, or a sawtooth waveform, among others. The absolute capacitive sensing signal may have a peak-to-peak amplitude in a range of about 1 V to about 10 V. However, in other embodiments, the absolute capacitive sensing signal may have a peak-to-peak amplitude greater than about 10 V or less than 1 V. In various embodiments, driving the sensor electrodes with an absolute capacitive sensing signal comprises modulating the sensor electrodes. A resulting signal received while performing absolute capacitive sensing may comprise effect(s) corresponding to one or more absolute capacitive sensing signals, and/or to one or more sources of environmental interference, e.g., other electromagnetic signals. The absolute capacitive sensing signal may be the same or different from the transcapacitive sensing signal used in transcapacitive sensing.

The sensor circuit 104 may operate the sensor electrodes 112 and the sensor electrodes 114 in multiple modes. For example, the sensor circuit 104 may operate the sensor electrodes for transcapacitive sensing in a first mode and absolute capacitive sensing in a second mode.

The determination circuit 106 receives the resulting signals from the sensor circuit 104 and processes the resulting signals to determine changes in capacitive coupling of the sensor electrodes 112 and 114. The determination circuit 106 utilizes the changes in capacitive coupling of the sensor electrodes 112 and 114 to determine positional information of one or more input objects (e.g., the input object 140). The determination circuit 106 may perform other functions, such as measuring the amount of noise present in one or more regions of a sensing area and/or determining whether positional information has been corrupted or degraded by noise.

In one or more embodiments, measurements of the changes in capacitive coupling determined from the resulting signals received from the sensor electrodes 114 (or sensor electrodes 112) may be utilized by the determination circuit 106 to form a capacitive image. The capacitive image may in certain embodiments include combining images acquired from multiple regions, e.g., the sensing region 118 and the sensing region 120. The resulting signals utilized to detect the changes in capacitive coupling are received during a capacitive frame. A capacitive frame may correspond to one or more capacitive images. Multiple capacitive images may be acquired over multiple time periods, and differences between the images used to derive information about an input object 140 in the sensing area of the input device 100. For example, successive capacitive images acquired over successive periods of time can be used to track the motion(s) of one or more input objects entering, exiting, and within the sensing area. The determination circuit 106 may combine images taken from multiple regions and "stich" the images together using any suitable means such as interpolation if necessary.

"Positional information" as used herein broadly encompasses absolute position, relative position, velocity, acceleration, and other types of spatial information in zero, one, two or three dimensions as appropriate. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Figure 2:
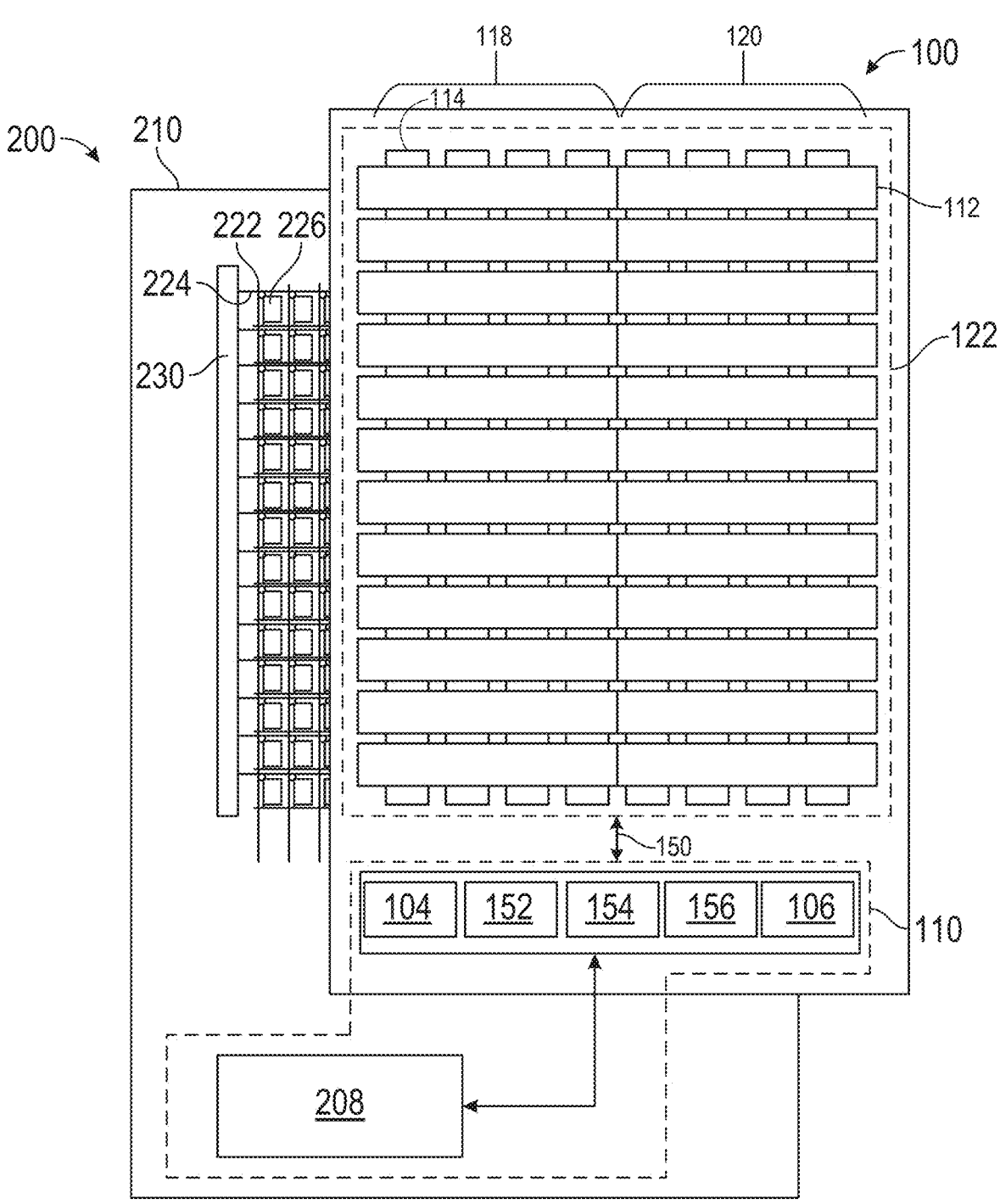
FIG. 2 is a block diagram of an input device with a display, according to one or more embodiments.

FIG. 2 illustrates an example of the input device 100 wherein the input device is shown overlapped and/or integrated with a display of a display device 200. The display of the display device 200 may be any suitable type of display such as, for example, light emitting diode (LED), microLED, organic LED (OLED), microOLED, liquid crystal display (LCD), plasma, electroluminescence (EL), or other display technology. The display may have any suitable aspect ratio including wide or ultrad-wide aspect ratio, e.g., 16:9, 8:5, or 7:1 as but a few illustrative examples.

In an exemplary configuration, the display device 200 includes a display panel 210 communicatively coupled with a display driver 208 and gate selection circuitry 230. The display panel 210 includes display electrodes that are driven to update subpixel electrodes 226 of the display panel 210. The display electrodes include data lines 222 and gate lines 224, among others.

The data lines 222 are coupled to the display driver 208 and the gate lines 224 are coupled to the gate selection circuitry 230. Each of the subpixel electrodes 226 is coupled to one of the gate lines 224 and one of the data lines 222. The gate selection circuitry 230 is configured to drive gate select and gate deselect signals onto the gate lines 224 to select (activate) and deselect (deactivate) corresponding subpixels for updating.

The display driver 208 includes display driver circuitry configured to drive the data lines 222 with subpixel data signals to update the selected subpixels electrodes 226 and update the display of the display device 200. For example, the display driver 208 may drive display update signals onto the data lines 222 during corresponding display updating periods.

The display driver 208 is configured to update the subpixel electrodes 226 to update an image displayed on the display panel 210 during display frames. The display frames may be updated, or refreshed, once about every 16 ms, generating a display refresh rate of about 60 Hz. In other embodiments, other display refresh rates may be employed. For example, the display refresh rate may be 90 Hz, 120 Hz, 140 Hz, or greater.

The display driver 208, the sensor circuit 104, the determination circuit 106, the AFEs 152, the ADCs 154, and the mixers 156 may be part of a common processing system (e.g., the processing system 110). Alternatively, the display driver 208 may be part of a first processing system and the sensor circuit 104, AFEs 152, the ADCs 154, the mixers 156, and the determination circuit 106 may be part of a second processing system. Further, the display driver 208, the sensor circuit 104, the AFEs 152, the ADCs 154, the mixers 156 and the determination circuit 106 may be part of a common IC chip. Alternatively, one or more of these components may be disposed in a first IC chip and a second one or more of these components may be disposed on a second IC chip, etc. As an alternative, any of the sensor circuit 104, AFEs 152, the ADCs 154, the mixers 156, and/or the determination circuit 106 may be one or more discrete circuits. As previously described, the processing system 110 may include an integral memory or be interfaced to a separate memory that stores computer executable instructions and/or data relating to touch sensing and display.

The "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or multiple of the display frame rate. Further, the capacitive frame rate may be a rational fraction of the display rate (e.g., 1/2, 2/3, 1, 3/2, 2). In one or more embodiments, the display frame rate may change while the capacitive frame rate remains constant. In other embodiment, the display frame rate may remain constant while the capacitive frame rate is increased or decreased. Alternately, the capacitive frame rate may be unsynchronized from the display refresh rate or the capacitive frame rate may be a non-rational fraction of the display rate to minimize interference "beat frequencies" between the display updating and the input sensing.

In one or more embodiments, capacitive sensing (or input sensing) and display updating may occur during at least partially overlapping periods. For example, the sensor circuitry 104 is configured to operate the sensor electrodes 112 and 114 for capacitive sensing while the display driver 208 operates the gate lines 224 and data lines 222 to update an image displayed by the display panel 210. For example, updating the display panel 210 and operating the sensor electrodes 112 and 114 for capacitive sensing may be asynchronous with each other. Further, updating the display panel 210 and operating the sensor electrodes 112 and 114 for capacitive sensing may or may not be synchronized with each other.

In one or more embodiments, updating the display panel 210 and operating the sensor electrodes 112 and 114 for capacitive sensing may occur during non-overlapping periods. For example, updating the display panel 210 may occur during display update periods and operating the sensor electrodes 112 and 114 for capacitive sensing may occur during non-display update periods. The non-display update periods may be a blanking period that occurs between the last line of a display frame and the first line of the following display frame (e.g., during a vertical blanking period). Further, the non-display update periods may occur between display line update periods for two consecutive display lines of a display frame and are at least as long in time as the display line update period. In such embodiments, the non-display update period may be referred to as a long horizontal blanking period or long h-blanking period, where the blanking period occurs between two display line updating periods within a display frame and is at least as long as a display line update period.

Figure 3:
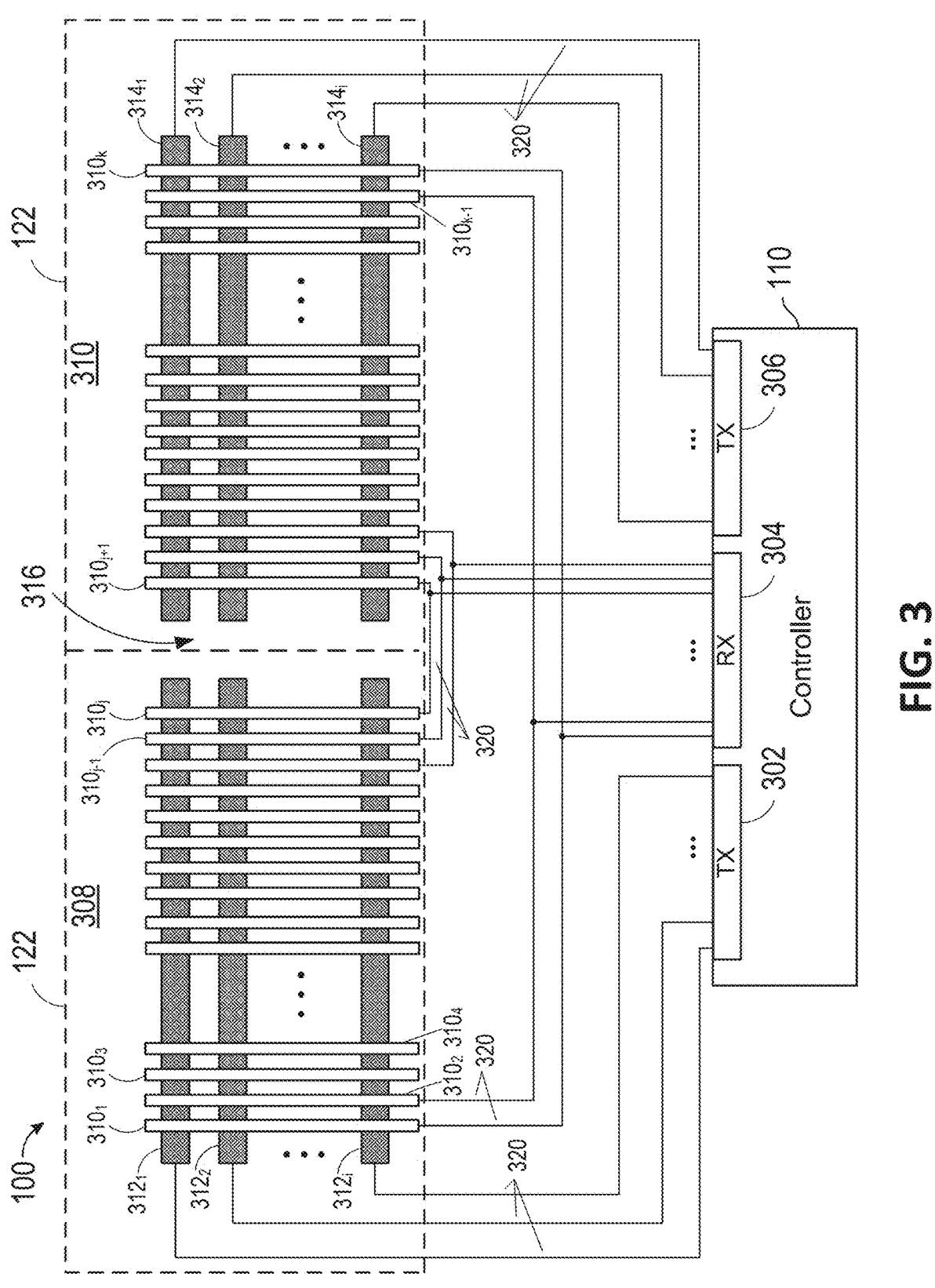
FIG. 3 is a block diagram of an input device with segmented electrodes, according to one or more embodiments.

FIG. 3 illustrates input device 100 configured for capacitive sensing in sensing area 122 using segmented electrodes according to one or more embodiments. The configuration of FIG. 3 is suitable for a sensing area of any shape and size including those with wide and ultra-wide aspect ratios. Disposed within the sensing area 122 are transmitter electrodes, generally labelled 312 and 314 and receiver electrodes, generally labelled 310. The capacitive sensing used in connection with FIG. 3 may, for example, be transcapacitive sensing.

In the example, two sets of receiver electrodes are shown. A first set of receiver electrodes $310_1$ through $310_j$ are disposed in a first sensing region 308 of the sensing area 122 and a second set of receiver electrodes $310_{j+1}$ through $310_k$ are disposed in a second sensing region of the sensing area 122. The receiver electrodes $310_1$ through $310_j$ and $310_{j+1}$ through $310_k$ are coupled to a receiver interface 304 of the processing system 110 (e.g., touch controller or touch and display controller) using conductive paths 320. The receiver interface 304 may include one or more AFEs, e.g., AFE 152. For example, each conductive path 320 may connect to an AFE with each conductive path 320 forming a receiver channel. Multiple receiver electrodes may be coupled to a single receiver channel. For example, the receiver electrodes $310_1$ and $310_k$ are coupled to a first receiver channel. Receiver electrodes $310_2$ and $310_{k-1}$ are coupled to a second receiver channel, receiver electrodes $310_j$ and $310_j+1$ are coupled to a $j^{th}$ channel and so forth.

The transmitter electrodes 312 form rows of electrodes wherein each row is segmented, e.g., in the particular embodiment shown, each row has two independently controllable transmitter electrodes. Transmitter electrodes $312_1$ through 312; form a first set of transmitter electrodes disposed in a first sensing region, e.g., left sensing region 308 of the sensing area 122, and transmitter electrodes $314_1$ through 314; form a second set of transmitter electrodes disposed in a second sensing region, e.g., right sensing region 310 of the sensing area 122. The transmitter electrodes $312_1$ through $312_i$ are coupled to transmitter interface 302 of the processing system 110 and the transmitter electrodes $314_1$ through 314; are coupled to transmitter interface 306 of the processing system 110. Coupling of the transmitter and receiver electrodes to the processing system may be through any suitable means such as via conductive paths 320, e.g., traces. Although two separate transmitter interfaces 302, 306 are shown, the arrangement may use a single transmitter interface or may include more than two transmitter interfaces.

A limited number of transmitter electrodes receiver electrodes are shown for purposes of illustration. However, it will be understood that any suitable number of receiver electrodes and transmitter electrodes may be employed. In general the system may have i rows, where each row may be segmented, and k receiver electrodes. Each sensing region may have a segment of each row and a subset of the receiver electrodes. As one example, 88 receiver electrodes may be used with 44 of the receiver electrodes in each display region. In the example, two receiver electrodes are connected to the receiver interface 304 per receiver channel using a common conductor 320. Accordingly, only 44 receiver channels, e.g. connections to the processing system, are needed. Further, 18 rows of segmented transmitter electrodes may be used. In the example, each row has two independently controllable transmitter electrodes, e.g., the first row includes transmitter segment $312_1$ and transmitter segment $314_1$, the second row incudes transmitter segment $312_2$ and transmitter segment $314_2$ etc., which provide for 36 connections to the processing system 110, e.g., two connections for each row. Further, although the sensing region 308 and the sensing region 310 have a same number of transmitter electrode segments in the example, the number of transmitter electrode segments may vary. For example, if the geometry of the sensing region 308 and the sensing region 310 are asymmetrical, each region may have a different number of transmitter electrode segments. It is thus possible that each row may not have a corresponding transmitter segment in each region.

As generally shown, a gap 316 may be present between transmitter electrodes 312 in the left sensing region 308 and the transmitter electrodes 314 in the right sensing region 310. This gap may result in dead space between the respective sensing regions. The dead space may be eliminated if the distance of the gap is equal to or less than the pitch of receiver electrodes, e.g., less than the distance between receiver electrodes. As a specific example, dead space can be eliminated or reduced if the distance between the receiver electrode $310_j$ and receiver electrode $310_{j+1}$ is about the same or less as compared to, by way of example, the distance between $310_j$ and $310_{j-1}$.

In operation, sensing signals are transmitted to the transmitter electrodes $312_1$-$312_i$ and to the transmitter electrodes $314_1$-$314_i$, e.g., the transmitter electrodes are driven with sensing signals such as transcapacitive sensing signals. Resulting signals are then received at receiver electrodes $310_1$ through $310_k$. The resulting signals are then analyzed to determine presence, location and/or motion of an input object. Such analysis may compare received signals to a baseline signal (signal strength in the absence of an input object) and/or determine if the received signal strength exceeds a minimum value.

The transmitter electrodes $312_1$-$312_i$ and $314_1$-$314_i$ may be operated in any suitable manner. For example, the transmitter electrodes may be operated sequentially. The left transmitter electrodes $312_1$-$312_i$ may be sequentially driven followed by sequentially driving the right transmitter electrodes $314_1$-$314_i$. Alternatively, the left and right transmitter electrodes may each be operated sequentially, but at the same time, e.g., simultaneously.

In some embodiments, code division multiplexed (CDM) sensing signals may be used and subsets of the transmitter electrodes may be simultaneously driven. For example, in CDM 4, four electrodes may be operated at a time. As a specific example, transmitter electrodes $312_1$-$312_4$ may be simultaneously driven using CDM. In the next sequence, transmitter electrodes $312_2$-$312_5$ are driven, etc. until all desired transmitter electrodes are driven. Other CDM schemes may be used. For example, in CDM 10, subsets of 10 transmitter electrodes are simultaneously driven and so forth.

In certain embodiments, multiple frequencies may be used to drive the transmitter electrodes. For example, the transmitter electrodes $312_1$-$312_i$ may be driven with first sensing signals having a first frequency. The transmitter electrodes $314_1$ through 314; may be driven with second sensing signals having a second frequency. The first frequency may be orthogonal to the second frequency. Using multiple orthogonal frequencies minimizes cross talk around boundary regions and facilitates simultaneous driving of the transmitter electrodes in different regions, e.g., simultaneous driving of the transmitter electrodes $312_1$-$312_i$ and the transmitter electrodes $314_1$ through 314; thereby reducing the number of sensing bursts and time to complete a sensing frame.

The processing system may generate two images of a touch event, e.g., a first image from the left sensing region 308 and a second image from the right region 310. The processing system 110 may combine, e.g., stitch the two images together. Any suitable means may be used to combine the images. For example, if the gap 316 is the same distance as the a distance between receiver electrodes, no interpolation may be needed. If the gap distance is greater than the distance between receiver electrodes, interpolation may be used to combine images.

Segmenting the transmitter electrodes as shown provides improved sensing. For example, because the length of the transmitter electrodes is about half or less, as compared to a non-segmented arrangement, resistance in the transmitter electrodes is reduced. Thus, the charge time needed to charge the transmitter electrodes in light of background capacitance is also reduced. The time needed for a capacitive frame is consequently reduced and more images can be acquired for more accurate sensing. Further, because the transmitter electrodes for region 308 and region 310 may be simultaneously driven as previously described, the time for a sensing frame is further reduced.

Although FIG. 3 illustrates an example depicting two sensing regions with segmented electrodes having two independent controllable transmitters per row, any suitable number of sensing regions and transmitter segments may be used. For example, FIG. 4 illustrates an embodiment similar to the embodiment of FIG. 3, except three sensing regions are shown where each transmitter row has three independently controllable segments.

Figure 4:
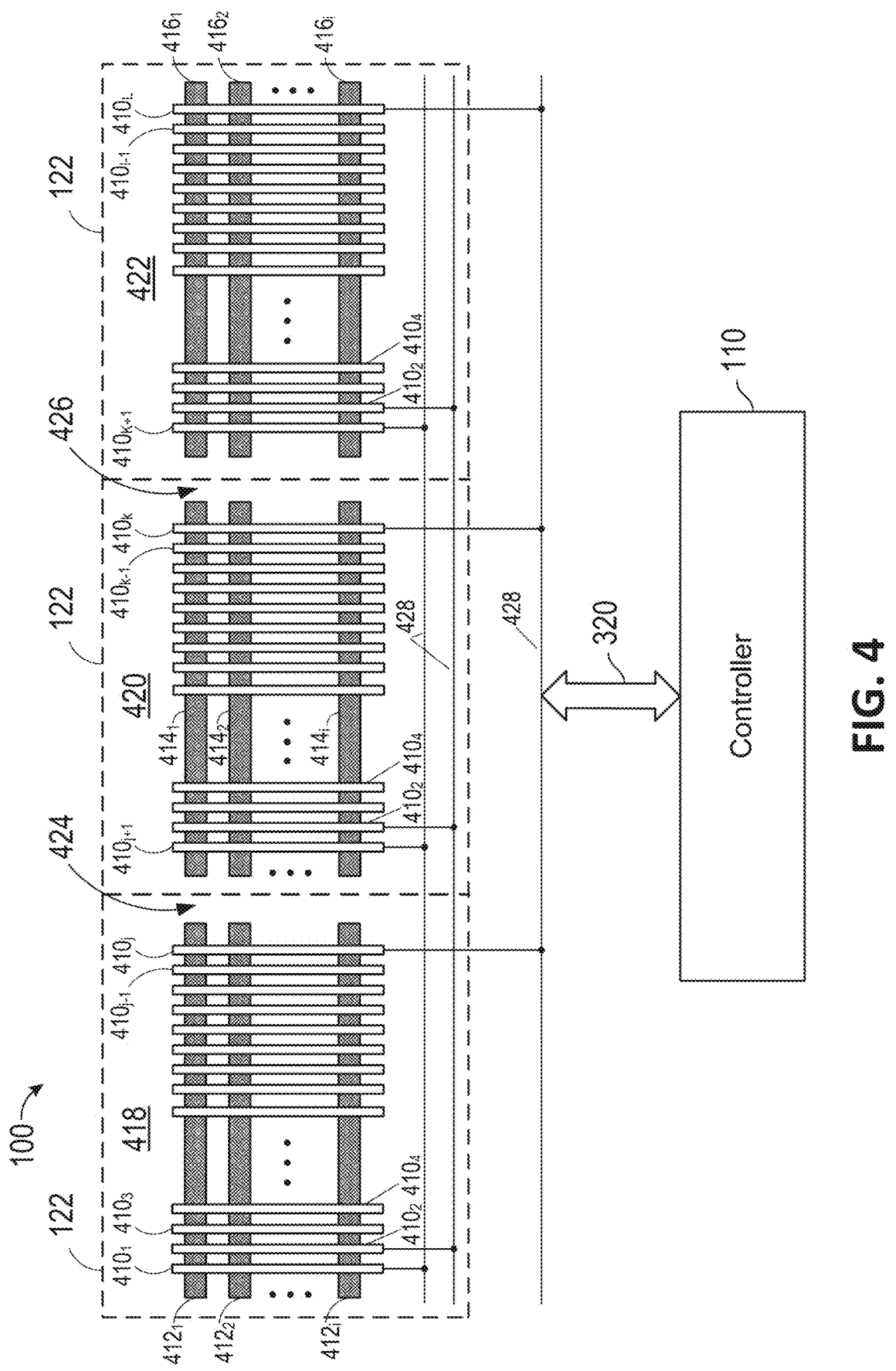
FIG. 4 is a block diagram of an input device with segmented electrodes, according to one or more embodiments.

As with the embodiment of FIG. 3, the configuration of FIG. 4 is suitable for a sensing area 122 of any shape and size including those with wide and ultra-wide aspect ratios. Disposed within the sensing area 122 are three sets of transmitter electrodes, a first set of transmitter electrodes generally labelled 412, a second set of transmitter electrodes generally labelled 414 and a third set of transmitter electrodes generally labelled 416. Also show are receiver electrodes, generally labelled 410.

In the example, three sets of receiver electrodes are shown. A first set of receiver electrodes $410_1$ through $410_j$ are disposed in a first sensing region 418 of the sensing area 122. A second set of receiver electrodes $410_{j+1}$ through $410_k$ are disposed in a second sensing region 420 of the sensing area 122. A third set of receiver electrodes $410_{k+1}$ through $410_L$ are disposed in a third sensing region 420 of the sensing area 122. The receiver electrodes 410 are coupled to a receiver interface of the processing system 110 (e.g., touch controller or touch and display controller). The receiver interface may include one or more AFEs, e.g., AFE 152. As shown, each receiver channel 428 may be connected to multiple, e.g., three, receiver electrodes.

The transmitter electrodes 412, 414 and 416 form rows of electrodes wherein each row is segmented, e.g., in the particular embodiment shown each row has three independently controllable transmitter electrodes. Transmitter electrodes $412_1$ through $412_i$ are disposed in the first sensing region, e.g., left sensing region 418 of the sensing area 122. Transmitter electrodes $414_1$ through $414_i$ are disposed in the second sensing region, e.g., middle sensing region 420 of the sensing area 122. Transmitter electrodes $416_1$ through $416_i$ are disposed in the third sensing region, e.g., right sensing region 422 of the sensing area 122. The transmitter electrodes in each respective region are coupled to the processing system 110 through one or more interfaces as previously described.

As with the embodiment of FIG. 3, a limited number of transmitter electrodes and receiver electrodes are shown; however, it will be understood that any suitable number of receiver electrodes and transmitter may be employed. Further, each sensing region 418, 420 and 422 depict a same number of transmitter electrode segments and a same number of receiver electrodes, however, the number of transmitter electrode segments and receiver electrodes in each region may vary.

A gap 424 may be present between transmitter electrodes 412 in the left sensing region 418 and the transmitter electrodes 414 in the middle sensing region 420. Similarly, a gap 426 may be present between transmitter electrodes 414 in the middle sensing region 418 and the transmitter electrodes 416 in the right sensing region 422. These gaps may present dead space between in the respective sensing regions. However, dead space can be eliminated or minimized by keeping the distance of any gap equal to or less than the pitch of receiver electrodes.

Operation of the sensing electrodes is similar to FIG. 3. The transmitter electrode segments 412, 414 and 416 are driven with sensing signals, e.g., transcapacitive sensing signals. Resulting signals are then received at receiver electrodes $410_1$ through $410_L$. The resulting signals are then analyzed to determine presence and location of an input object as generally described in FIG. 3. For example, the transmitter electrodes may be operated sequentially. Alternatively, the left, middle and right transmitter electrodes may each be operated sequentially within each region, but the transmitter electrodes in each region may be driven at the same time, e.g., simultaneously. As with the embodiment of FIG. 3, CDM may be used and subsets of the transmitter electrodes may be simultaneously driven.

As also described in connection with FIG. 3, multiple frequencies may be used to drive the transmitter electrodes. For example, the transmitter electrodes $412_1$-$412_i$ may be driven with first sensing signals having a first frequency. The transmitter electrodes $414_1$ through $414_i$ may be driven with second sensing signals having a second frequency. The transmitter electrodes $416_1$ through $416_i$ may be driven with third sensing signals having a third frequency. These frequencies may be orthogonal to one another and the transmitter electrodes in each region may be simultaneously driven.

The processing system may generate three images of a touch event, e.g., a first image from the left sensing region 418, a second image from the middle sensing region 420, and a third image from the right sensing region 422. The processing system 110 may combine, e.g., stitch the three images together as previously described. If needed, interpolation may be used to resolve imaging of the input object in the area of the gap 424 and the gap 426.

Figure 5:
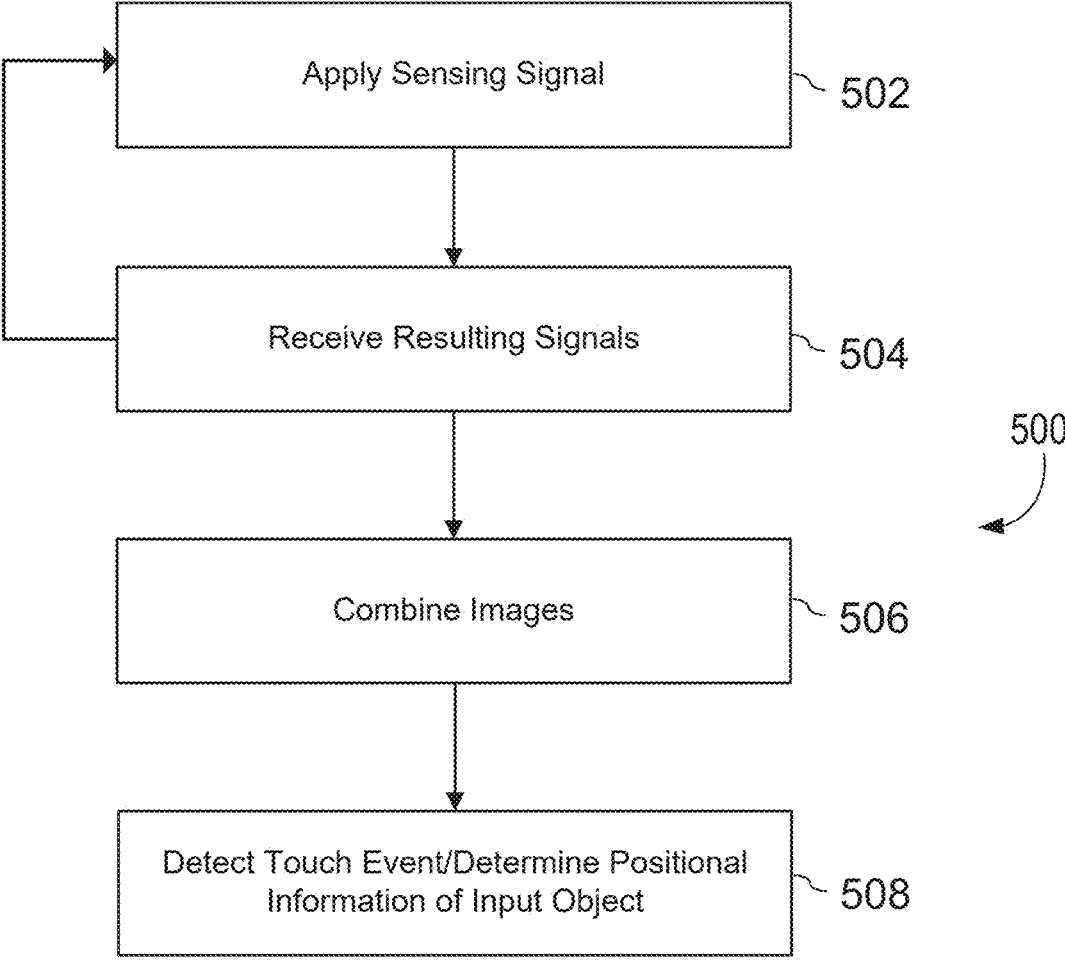
FIG. 5 is a method for performing capacitive sensing using segmented electrodes, according to one or more embodiments.

FIG. 5 illustrates a method or process 500 that may be used to perform capacitive sensing in accordance with the embodiments described herein. The method may, for example, be used according to the embodiments described in connection with FIGS. 1-4. The method may be performed in whole or in part by a processor in communication with a memory. For example, the method may be performed by processing system 110. The method may be performed in whole or in part by executing computer readable instructions stored in non-transitory memory. The method be performed in whole or in part using discrete circuits. It will be understood that the method need not be performed in the sequence shown except where otherwise apparent.

At stage 502, the processing system drives sensor electrodes with sensing signals. For example, transcapacitive sensing signals are applied to transmitter electrodes 312 and 314 as shown in FIG. 3 or transmitter electrodes 412, 414 and 416 as shown in FIG. 4.

The transmitter electrodes may be driven by the sensing signals in any suitable order. For example, the transmitter electrodes may be driven sequentially. In certain implementations, multiple transmitter electrodes may be driven at the same time, for example, when CDM and/or multiple frequencies, e.g., multiple orthogonal frequencies, are used.

In certain embodiments, the transmitter electrodes are segmented. For example, a first set of segmented electrodes are disposed in a first sensing region of a sensing area and a second set of transmitter electrodes are disposed in a second sensing region of the sensing area. The sensing signals may be applied to the transmitter electrodes in the first sensing region and subsequently to the transmitter electrodes in the second sensing region. Alternatively, the sensing signals may be applied to the transmitter electrodes of the first sensing region and the transmitter electrodes of the second sensing region at the same time. The sensing signals applied to the transmitter electrodes in the first sensing region may have a first frequency and the sensing signals applied to the transmitter electrodes in the second sensing region may have a second frequency. In certain embodiments, the first frequency and the second frequency may be the same. In other embodiments, the first frequency and the second frequency may be different and may be orthogonal to one another.

It will be understood that, although the method is described using two sensing regions, embodiments contemplate that more than two sensing regions may be used. For example, the method may be applied to third sensing region and so on. In the case of a third sensing region, a third set of transmitter electrodes are disposed in a third sensing region. The third set of transmitter electrodes may be driven with sensing signals having a third frequency. The third frequency may be the same as the first and second frequency or, alternatively, the third frequency may be different than the first frequency and the second frequency. In certain embodiments, the third frequency may be orthogonal the first frequency and the second frequency.

At stage 504, resulting signals are received and read from receiver electrodes. For example, the resulting signals are read from the receiver electrodes 310 in the embodiment of FIG. 3 or the receiver electrodes 410 of FIG. 4. It will be understood that stage 504 may occur simultaneously or overlapping with stage 502. Stages 502 and 504 may be iteratively performed until sensing has been performed in each of the desired sensing regions, e.g., one or more of sensing regions 308 and 310 of FIG. 3 or one or more of sensing regions 418, 420 and 422 of FIG. 4. As previously described, reading the resulting signals may include reading signals from multiple receiving channels. Each of the receiver channels may be coupled to multiple receiver electrodes, e.g., each receiver channel may be coupled to one receiver electrode from each sensing region.

The resulting signals may be further processed. For example, the resulting signals from each sensing region may used to generate an image or partial image representative of the presence or absence of a touch event (e.g., proximity of an input object) in each respective region. In step 506, the partial image from each region may be combined to form an overall image. The partial images may be combined using interpolation where needed to account for any gap in receiver electrodes between the regions.

In stage 508, the processing system detects a touch event. For example, the processing determines whether an input object is proximate to one or more sensing regions of the sensing area of the input device. The processing system may also determine over a series of capacitive frames whether the input object is in motion, e.g., making a gesture, or the like. The processing system may then execute one or more operations as a result of the detected location of the input object, e.g., may execute or close an application operating on an electronic device consistent with the touch event.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order and/or simultaneously unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Example embodiments are described herein. Variations of those embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. For example, although generally described for use as a capacitive sensor, the described arrangement may be used to with other sensing technologies. Moreover, any combination of the above-described elements in all possible variations thereof is encompassed by the invention unless otherwise indicated herein or otherwise clearly contradicted by context.

The invention claimed is:

1. An input device comprising:
a sensing area having a first sensing region and a second sensing region:
a plurality of receiver electrodes comprising a first set of receiver electrodes disposed in the first sensing region of the sensing area and a second set of receiver electrodes disposed in the second sensing region of the sensing area:
a plurality of segmented transmitter electrodes, wherein each segmented transmitter electrode of the plurality of segmented transmitter electrodes comprises a first transmitter electrode and a second transmitter electrode, wherein the first transmitter electrode is isolated from the second transmitter electrode such that the first transmitter electrode is separately controllable from the second transmitter electrode, and wherein the first transmitter electrode is disposed in the first sensing region of the sensing area and the second transmitter electrode is disposed in the second sensing region of the sensing area; and
a sensor circuit configured to:
   drive the plurality of segmented transmitter electrodes with sensing signals;
   receive resulting signals from the plurality of receiver electrodes; and
   detect presence of an input object proximate to the sensing area,
wherein the plurality of receiver electrodes are coupled to the sensor circuit using a plurality of receiver channels, and wherein each receiver channel is coupled to at least one receiver electrode of the first set of receiver electrodes and at least one receiver electrode of the second set of receiver electrodes.

2. The input device of claim 1, further comprising:
a third set of receiver electrodes disposed in a third sensing region of the sensing area;
a third transmitter electrode being part of each segmented transmitter electrode, wherein the third transmitter electrode is isolated from the first transmitter electrode and the second transmitter electrode such that the third transmitter electrode is separately controllable from the first transmitter electrode and the second transmitter electrode, and wherein the third transmitter electrode is disposed in the third sensing region of the sensing area, wherein each receiver channel is further coupled to at least one receiver electrode of the third set of receiver electrodes.

3. The input device of claim 1, wherein the sensing area has an ultra-wide aspect ratio.

4. The input device of claim 1, wherein the sensor circuit is further configured to drive the first transmitter electrode with first sensing signals having a first frequency and to drive the second transmitter electrode with second sensing signals having a second frequency.

5. The input device of claim 4, wherein the first frequency is orthogonal to the second frequency.

6. The input device of claim 1, wherein the sensor circuit is configured for transcapacitive sensing.

7. The input device of claim 1, wherein the plurality of segmented transmitter electrodes are driven using code division multiplexed (CDM) sensing signals.

8. The input device of claim 1, wherein each receiver channel is coupled to the at least one receiver electrode of the first set of receiver electrodes and the at least one receiver electrode of the second set of receiver electrodes via a common analog front end (AFE).

9. The input device of claim 5, wherein driving the first transmitter electrode with the first sensing signals occurs simultaneously to driving the second transmitter electrode with the second sensing signals.

10. The input device of claim 3, wherein the ultra-wide aspect ratio is 7:1 or wider and wherein the sensor circuit comprises a single controller coupled to the segmented transmitter electrodes and the plurality of receiver electrodes.

11. A processing system, comprising:

a sensor circuit configured to:

drive a plurality of segmented transmitter electrodes with sensing signals, wherein each segmented transmitter electrode of the plurality of segmented transmitter electrodes comprises a first transmitter electrode and a second transmitter electrode, wherein the first transmitter electrode is isolated from the second transmitter electrode such that the first transmitter electrode is separately controllable from the second transmitter electrode, and wherein the first transmitter electrode is disposed in a first sensing region of a sensing area and the second transmitter electrode is disposed in a second sensing region of the sensing area:

receive resulting signals from a plurality of receiver electrodes, wherein the plurality of receiver electrodes comprise a first set of receiver electrodes disposed in the first sensing region of the sensing area and a second set of receiver electrodes disposed in the second sensing region of the sensing area; and detect presence of an input object proximate to the sensing area, wherein the plurality of receiver electrodes are coupled to the sensor circuit using a plurality of receiver channels, and wherein each receiver channel is coupled to at least one receiver electrode of the first set of receiver electrodes and at least one receiver electrode of the second set of receiver electrodes.

12. The processing system of claim 11, further comprising:

wherein the plurality of receiver electrodes further comprises a third set of receiver electrodes disposed in a third sensing region of the sensing area:

wherein each segmented transmitter electrode of the plurality of segmented transmitter electrodes further comprises a third transmitter electrode, wherein the third transmitter electrode isolated from the first transmitter electrode and the second transmitter electrode such that the third transmitter electrode is separately controllable from the first transmitter electrode and the second transmitter electrode, and wherein the third transmitter electrode is disposed in the third sensing region of the sensing area, wherein each receiver channel is further coupled to at least one receiver electrode of the third set of receiver electrodes.

13. The processing system of claim 11, wherein the sensing area has an ultra-wide aspect ratio.

14. The processing system of claim 11, wherein the sensor circuit is further configured to drive the first transmitter electrode with first sensing signals having a first frequency and to drive the second transmitter electrode with second sensing signals having a second frequency.

15. The processing system of claim 14, wherein the first frequency is orthogonal to the second frequency.

16. A method for sensing an input object, comprising:

driving a plurality of segmented transmitter electrodes with sensing signals, wherein each segmented transmitter electrode of the plurality of segmented transmitter electrodes comprises a first transmitter electrode and a second transmitter electrode, wherein the first transmitter electrode is isolated from the second transmitter electrode such that the first transmitter electrode is separately controllable from the second transmitter electrode, and wherein the first transmitter electrode is disposed in a first sensing region of a sensing area and the second transmitter electrode is disposed in a second sensing region of the sensing area:

receiving resulting signals from a plurality of receiver electrodes, wherein the plurality of receiver electrodes comprise a first set of receiver electrodes disposed in the first sensing region of the sensing area and a second set of receiver electrodes disposed in the second sensing region of the sensing area; and detecting presence of the input object proximate to the sensing area, wherein the plurality of receiver electrodes are coupled to a sensor circuit using a plurality of receiver channels, and wherein each receiver channel is coupled to at least one receiver electrode of the first set of receiver electrodes and at least one receiver electrode of the second set of receiver electrodes.

17. The method of claim 16, further comprising:

wherein the plurality of receiver electrodes further comprises a third set of receiver electrodes disposed in a third sensing region of the sensing area:

wherein each segmented transmitter electrode of the plurality of segmented transmitter electrodes further comprises a third transmitter electrode, wherein the third transmitter electrode is isolated from the first transmitter electrode and the second transmitter electrode such that the third transmitter electrode is separately controllable from the first transmitter electrode and the second transmitter electrode, and wherein the third transmitter electrode is disposed in the third sensing region of the sensing area, wherein each receiver channel is further coupled to at least one receiver electrode of the third set of receiver electrodes.

18. The method of claim 16, wherein the sensing area has an ultra-wide aspect ratio.

19. The method of claim 16, further comprising:

driving the first transmitter electrode with first sensing signals having a first frequency; and driving the second transmitter electrode with second sensing signals having a second frequency.

20. The method of claim 19, wherein the first frequency is orthogonal to the second frequency.

\* \* \* \* \*